A. T. McCREARY.
MACHINE FOR FORMING CALKS ON HORSESHOES.
APPLICATION FILED DEC. 8, 1906.

937,461.

Patented Oct. 19, 1909.
3 SHEETS—SHEET 2.

Witnesses
J. G. Hinkel
M. Crandell

Inventor
A. T. McCreary
by Foster Freeman & Watson
Attorneys

A. T. McCREARY.
MACHINE FOR FORMING CALKS ON HORSESHOES.
APPLICATION FILED DEC. 8, 1906.

937,461.

Patented Oct. 19, 1909.
3 SHEETS—SHEET 3.

Witnesses

Inventor
A. T. McCreary
by Foster Freeman Watson
Attorneys

UNITED STATES PATENT OFFICE.

ABRAM T. McCREARY, OF FORTY FORT, PENNSYLVANIA.

MACHINE FOR FORMING CALKS ON HORSESHOES.

937,461.  Specification of Letters Patent.  Patented Oct. 19, 1909.

Application filed December 8, 1906. Serial No. 346,956.

To all whom it may concern:

Be it known that I, ABRAM T. MCCREARY, a citizen of the United States, and resident of Forty Fort, Luzerne county, State of Pennsylvania, have invented certain new and useful Improvements in Machines for Forming Calks on Horseshoes, of which the following is a specification.

The present invention relates to improvements in machines for forming heel calks upon horseshoes and has for its object to provide a mechanism by which a blacksmith may form and finish a heel calk, which will extend longitudinally of the member of the shoe on which it is formed, without reheating the shoe.

Figure 1:
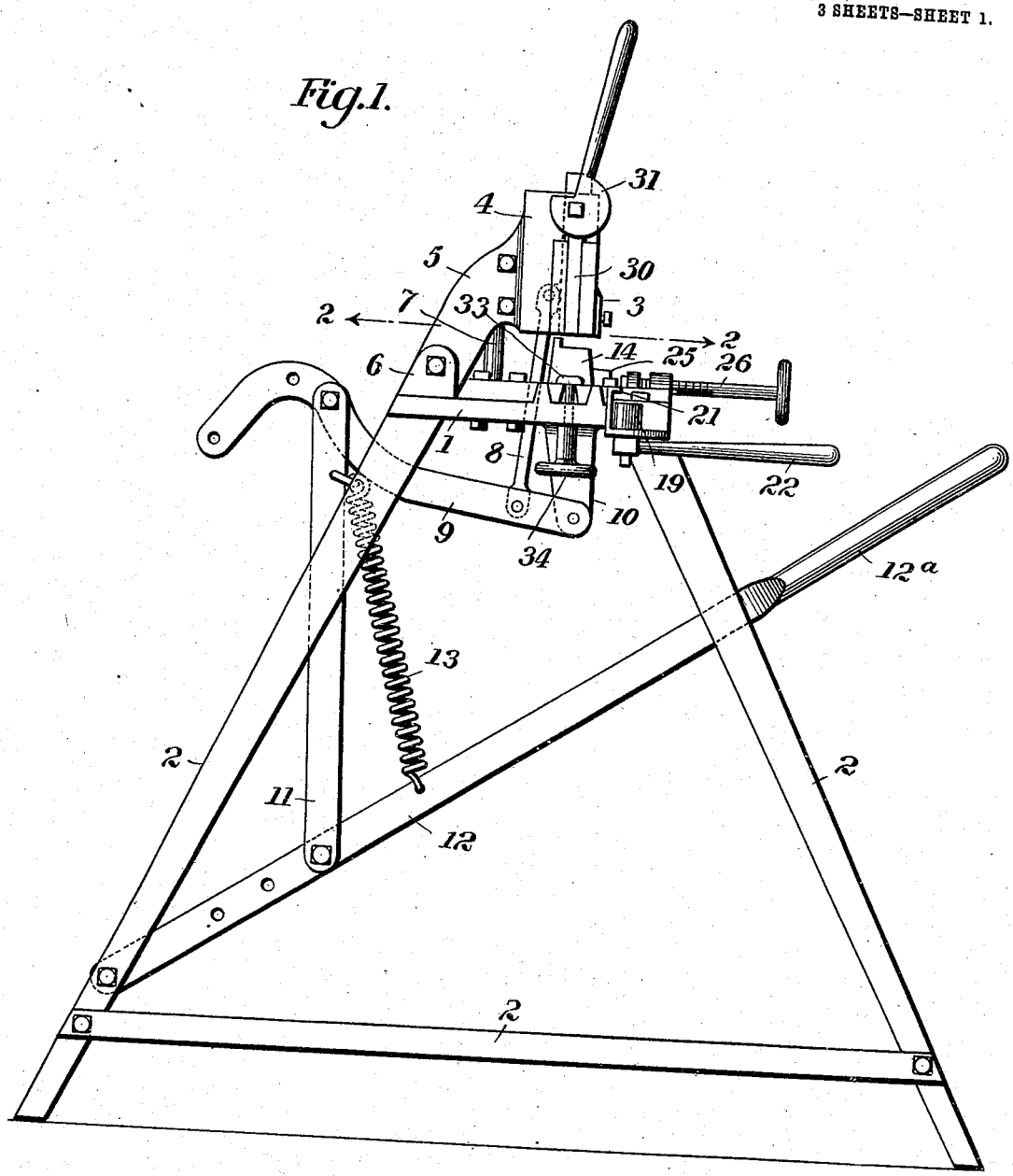
Figure 2:
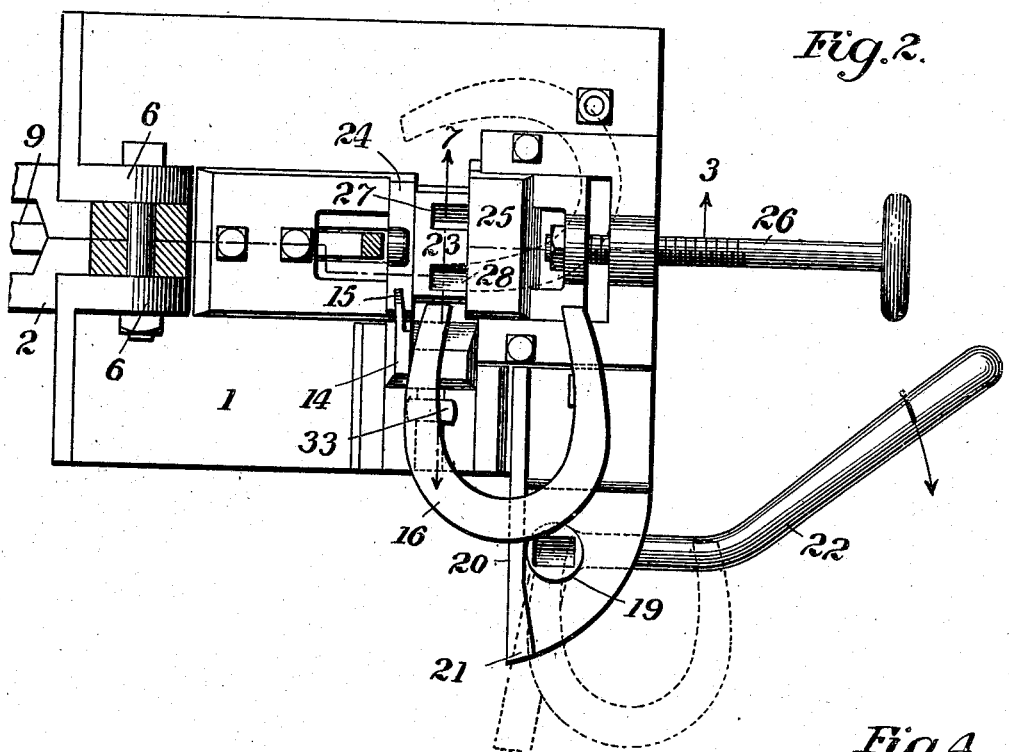
Figure 3:
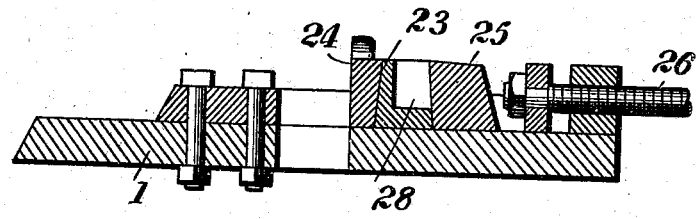
Figure 4:
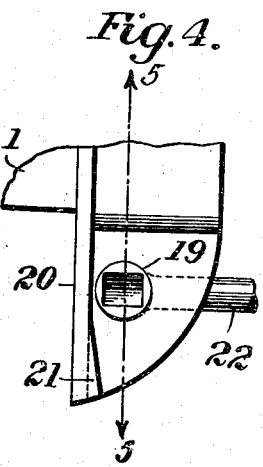
Figure 5:
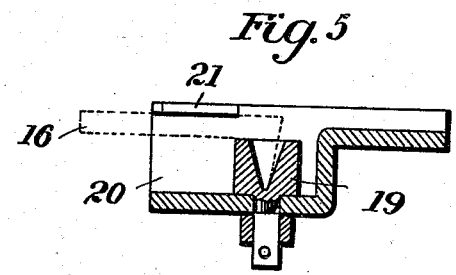
Figure 6:
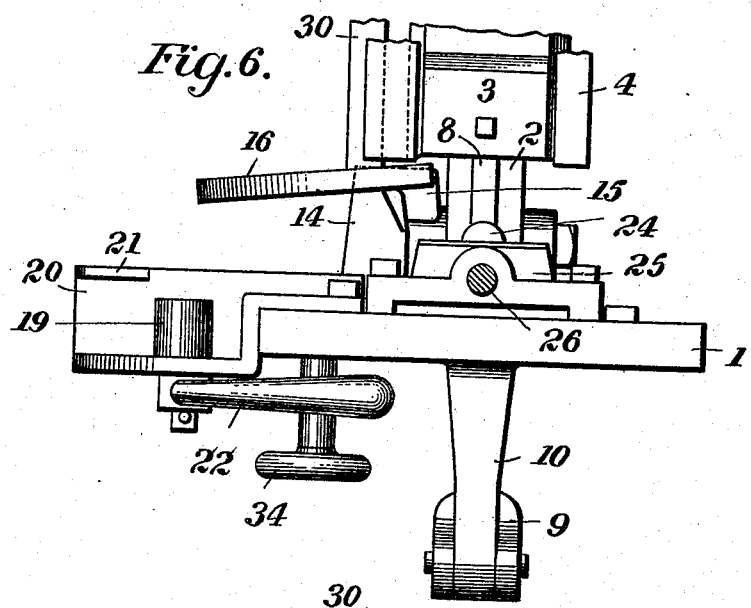
Figure 7:
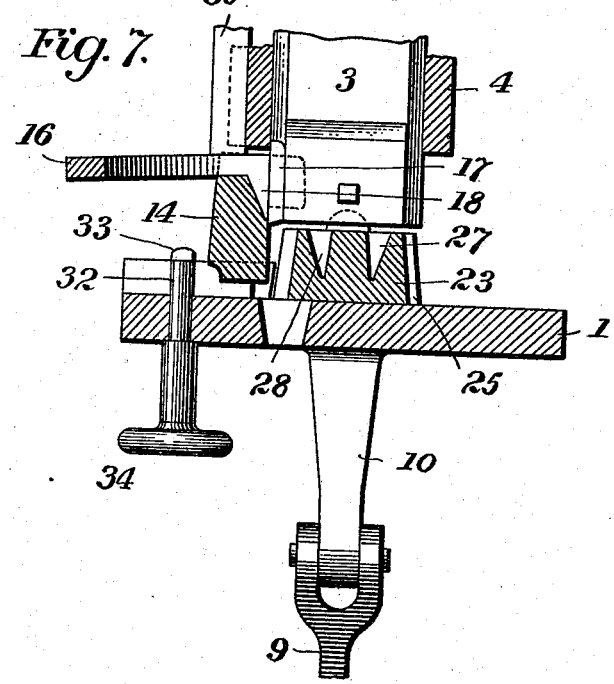

In the accompanying drawings, Figure 1 is a side elevation of a machine constructed in accordance with the present invention; Fig. 2 is a plan view, partly in section on the line 2—2 of Fig. 1, on an enlarged scale; Fig. 3 is a vertical sectional view on the line 3—3 of Fig. 2; Fig. 4 is a detail plan of a portion of the mechanism, illustrating particularly the devices for turning the calk; Fig. 5 is a longitudinal sectional view on the line 5—5 of Fig. 4; Fig. 6 is a front elevation of a portion of the mechanism; Fig. 7 is a sectional view on the line 7—7 of Fig. 2.

Referring to the drawings, the machine comprises a bed plate 1 which is substantially rectangular in form and mounted upon a suitable supporting frame 2. A plunger 3 is mounted in a suitable guide 4 supported above the bed plate, said guide being carried by an arm 5 which extends between and is connected to ears 6 rising from the bed plate, and said arm 5 is braced or stayed by a brace 7. The plunger 3 is connected through a link 8 with a lever 9 having its forward end fulcrumed to a lug 10 depending from the bed plate and the rear end of said lever is connected by a link 11 with a hand lever 12, pivoted at its rear end upon the frame 2 and extending forwardly beyond said frame and bed plate. A spring 13 connects the link 11 and lever 12 and acts to normally hold the parts in the position shown in Fig. 1 in which the handle 12ª of the lever is elevated. By depressing the forward end of the lever 12, the plunger 3 may be moved downwardly and caused to exert pressure upon any article placed beneath it, the extent of power or pressure exerted by said plunger being regulated by adjusting the connecting link 11 between the levers 9 and 12. As shown this connecting link may be attached to said levers at any of several points, to vary the leverage and power exerted by the plunger as desired.

The heel calks are primarily formed by the coöperation of the plunger 3 and a die 14, which is connected to the bed 1. As shown, this die is provided with a beveled or inclined face adjacent the plunger and with a side guide or flange 15. When a shoe 16 is placed in the position shown in Fig. 6, with the heel upon which the calk is to be formed projecting over the beveled face of the die 14, and the lever 12 is operated, a blade 17 on the plunger 3 will act upon the projecting heel as the plunger descends and bend such end downwardly against the inclined face of the die 14. Said blade is of such form and so related to the die that it acts as a shear or cutter to remove a slight portion of the shoe heel and form a wedge shaped calk 18.

The calk 18 formed as above described, extends transversely of the shoe. It is desirable particularly in forming heel calks on heavy shoes, that the outside calk extend in the direction of the length of the shoe, or at substantially right angles to the position shown in Fig. 7, in order to prevent lateral slipping when in use. Means are therefore provided for turning the calk 18 without destroying or in any way damaging the form thereof, or dulling the lower edge. To effect this there is provided in the machine, at one side of the die 14, a revoluble socket piece 19, the socket in which is of the same cross sectional form as the heel calk formed as aforesaid by the die 14 and the plunger 3. With said socket 19 coöperates an abutment 20 on the bed plate against which a side of the shoe will bear when the heel calk 18 is inserted in said socket. This abutment is provided adjacent its outer end with a horizontal flange 21, which projects over the upper edge of a shoe when its calk is inserted in the socket 19 and acts to hold it in engagement with said socket. A handle 22 is connected with the socket by means of which it may be readily turned. It will be seen that the socket 19 is adapted for turning either a right or left heel calk.

In the drawings, there is represented a shoe in which the right heel calk is engaged by said socket and in which the right hand side of the shoe bears against the abutment.

In case the left hand calk was to be turned, the abutment would extend between the members of the shoe and bear against the inner face of the left hand side thereof.

In some instances it may be desirable to further compress or smooth the faces of a calk that has been formed by the die 14 and plunger 3 and turned by the socket 19; and for this purpose a die 23 is mounted beneath the plunger 3. This die is held in place between an abutment 24 and a sliding clamp piece 25, which is adapted to be adjusted to and from said die by a screw 26. In the die 23 are formed two recesses 27, 28, adapted to respectively receive a right and left hand calk. When the shoe has been placed over said die with the turned calk in the proper socket 27 or 28, the plunger 3 is depressed, by moving the power lever 12, and caused to exert pressure upon the shoe and force the faces of the calk against the sides of the recess in the die, thus pressing and smoothing the same.

It will be understood that all of the operations above described are effected without reheating the shoe. That is, the smith having brought the shoe to the requisite heat places it upon the die 14, in which position it may be held by a clamp 30 mounted in the side of the plunger guide 4 and adapted to be reciprocated to and from the die 14 by a lever 31. The power lever 12 is then depressed and the plunger 3 quickly bends and shears the calk 18. The plunger is then lifted and the handle 31 operated to release the shoe which is then placed in position to have its calk 18 enter the socket 19, with one side of the shoe bearing against the abutment 20. A single movement of the handle 22 turns the calk and then the shoe is again placed beneath the plunger 3 with its turned calk in one of the recesses 27, 28, of the die 23, and the operation of forming the calk completed by again depressing the power lever 12. By this means it is possible to completely form a heel calk with a single heating of the shoe and with a minimum amount of labor on the part of the blacksmith. The calks thus formed are superior to those formed by hand, in that they are uniform and do not require sharpening after they have been made.

The die 14 may be mounted in any desired manner. As shown, it is provided with a forked base, through the slot in which extends a clamping bolt 32 having at its upper end a transverse head 33 adapted to extend across the slot in the fork portion of the die and to draw the same close against the bed 1 when the hand wheel 34 is turned. The guide or flange 15 of the die 14 indicates to the blacksmith the proper distance that the shoe 16 should project beyond the die, in order to form a calk of the required length.

Having described my invention what I claim and desire to secure by Letters-Patent is, 1. In a machine for forming on a horse shoe a heel calk of the character described, the combination with a rotatable device adapted to engage a horse shoe heel calk extending transversely of the shoe, a stationary abutment at one side of said device against which the limb of the shoe carrying the calk bears when the calk is engaged by said device, and means for turning said calk engaging device.

2. In a machine for forming on a horse shoe heel calk of the character described, the combination with a rotatable device having therein a socket conforming in cross sectional form to and adapted to receive a horse shoe heel calk, means for turning said device, and means for preventing the shoe from turning with said device.

3. In a machine for forming on a horse shoe a heel calk of the character described, the combination with a rotatable device having therein a socket conforming in cross sectional form to and adapted to receive a horse shoe heel calk, means for turning said device, and an abutment against which the limb of the shoe carrying the calk bears when the calk is seated in said socket, said abutment having a lateral flange that projects over said limb of the shoe.

4. In a machine for forming on a horse shoe a heel calk of the character described, the combination with a rotatable device adapted to turn about a vertical axis and having at its upper end a wedge-shaped socket to receive a horse shoe heel calk, means for turning said device, and means for preventing the shoe from moving with said device and the calk engaged thereby.

In testimony whereof I affix my signature in presence of two witnesses.

ABRAM T. McCREARY.

Witnesses:
W. L. ROEDER,
K. E. FERRY.